United States Patent
Dupont et al.

(10) Patent No.: US 7,891,303 B2
(45) Date of Patent: Feb. 22, 2011

(54) SYSTEM FOR GUIDING A VEHICLE ALONG AT LEAST ONE GUIDING RAIL

(75) Inventors: Bernard Dupont, Eaubonne (FR); Luo Boulat, Vincennes (FR); Rémi Forget, Neauphlette (FR)

(73) Assignee: Societe Europeenne d'Ingeniere Mecanique - Eurodim, Rueil Malmaison Cedex (FR)

( * ) Notice: Subject to any disclaimer, the term of this patent is extended or adjusted under 35 U.S.C. 154(b) by 579 days.

(21) Appl. No.: 10/573,411

(22) PCT Filed: Oct. 1, 2004

(86) PCT No.: PCT/FR2004/002496

§ 371 (c)(1),
(2), (4) Date: Dec. 5, 2006

(87) PCT Pub. No.: WO2005/032905

PCT Pub. Date: Apr. 14, 2005

(65) Prior Publication Data

US 2007/0119333 A1 May 31, 2007

(30) Foreign Application Priority Data

Oct. 2, 2003 (FR) .................................. 03 11577
Nov. 14, 2003 (FR) .................................. 03 13373

(51) Int. Cl.
*B61F 1/00* (2006.01)

(52) U.S. Cl. ............... 105/215.1; 105/72.2; 104/242; 104/243; 104/244; 104/245

(58) Field of Classification Search ............... 104/242, 104/243, 244, 245; 105/72.2, 215.1
See application file for complete search history.

(56) References Cited

U.S. PATENT DOCUMENTS

| 128,597 A | * | 7/1872 | Crew ........................... 104/120 |
| 933,914 A | * | 9/1909 | Neville ........................ 104/247 |
| 3,780,666 A | * | 12/1973 | Perrott ................... 104/130.01 |
| 4,702,661 A | * | 10/1987 | Bisiach ........................ 414/460 |
| 4,729,322 A | * | 3/1988 | Harshberger ................ 104/245 |
| 5,551,347 A | * | 9/1996 | Gutknecht ..................... 104/53 |
| 6,012,396 A | * | 1/2000 | Schulz ........................ 105/72.2 |
| 6,029,579 A | * | 2/2000 | Andre et al. ................ 105/72.2 |
| 6,298,792 B1 | * | 10/2001 | Jackson, Jr. ................ 105/215.1 |

(Continued)

FOREIGN PATENT DOCUMENTS

| CH | 445 319 | 10/1967 |
| DE | 41 38 200 | 5/1993 |

*Primary Examiner*—S. Joseph Morano
*Assistant Examiner*—Jason C Smith
(74) *Attorney, Agent, or Firm*—Leydig, Voit & Mayer, Ltd.

(57) ABSTRACT

A system for guiding a vehicle along a guiding rail includes a guide roller device, with at least one rolling bearing roller and at least one lateral roller having a diameter and shape contacting the rail so that the lateral roller has the same speed at a point of contact with the rail as the central bearing roller on a rolling surface on the rail. The system can be used for tramways.

15 Claims, 16 Drawing Sheets

U.S. PATENT DOCUMENTS

| | | | |
|---|---|---|---|
| 6,431,082 B1* | 8/2002 | Kummeter et al. | 105/215.1 |
| 6,450,103 B2* | 9/2002 | Svensson | 104/120 |
| 6,477,963 B1* | 11/2002 | Weule et al. | 104/243 |
| 6,523,480 B1* | 2/2003 | Jensen | 104/118 |
| 7,228,803 B2* | 6/2007 | Andre et al. | 104/244 |
| 2001/0037747 A1* | 11/2001 | Svensson | 104/120 |
| 2002/0026880 A1* | 3/2002 | Henderson | 104/242 |
| 2002/0073881 A1* | 6/2002 | Kummeter et al. | 105/215.1 |
| 2005/0172851 A1* | 8/2005 | Andre et al. | 104/244 |
| 2007/0044678 A1* | 3/2007 | Roane | 105/72.2 |
| 2007/0079724 A1* | 4/2007 | Lohr et al. | 105/72.2 |
| 2007/0113754 A1* | 5/2007 | Andreasson et al. | 104/242 |
| 2007/0119333 A1* | 5/2007 | Dupont et al. | 105/72.2 |

* cited by examiner

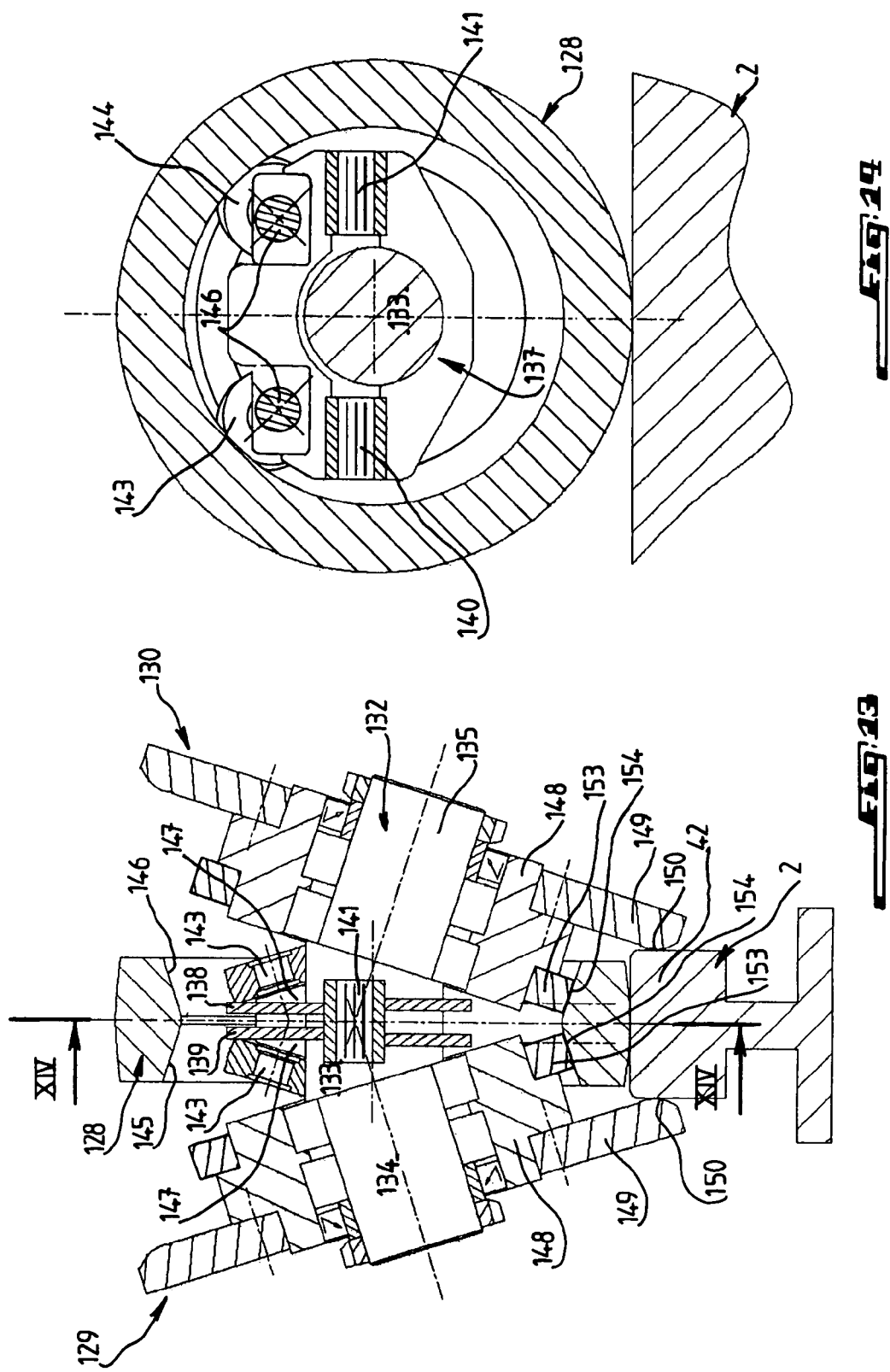

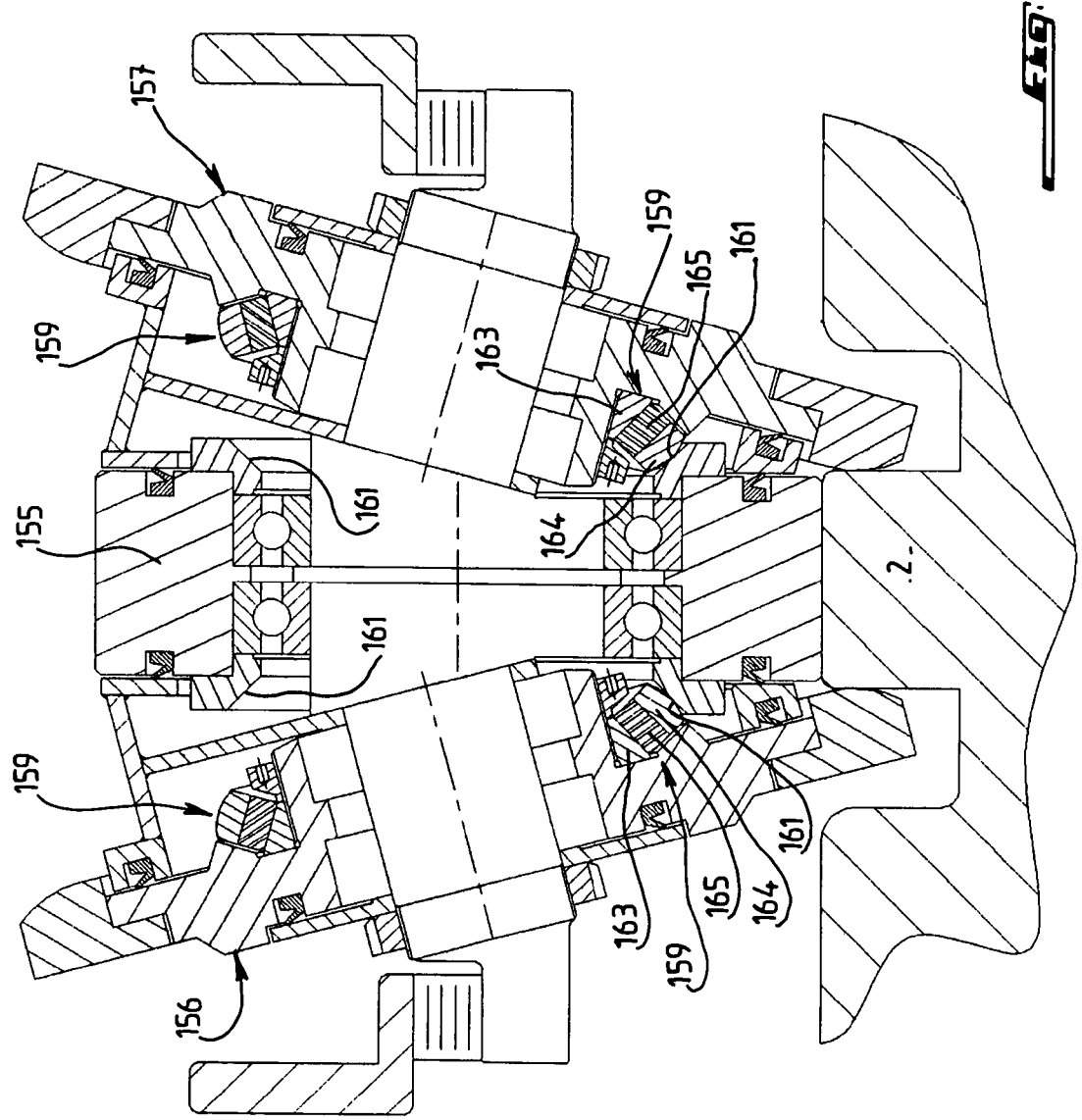

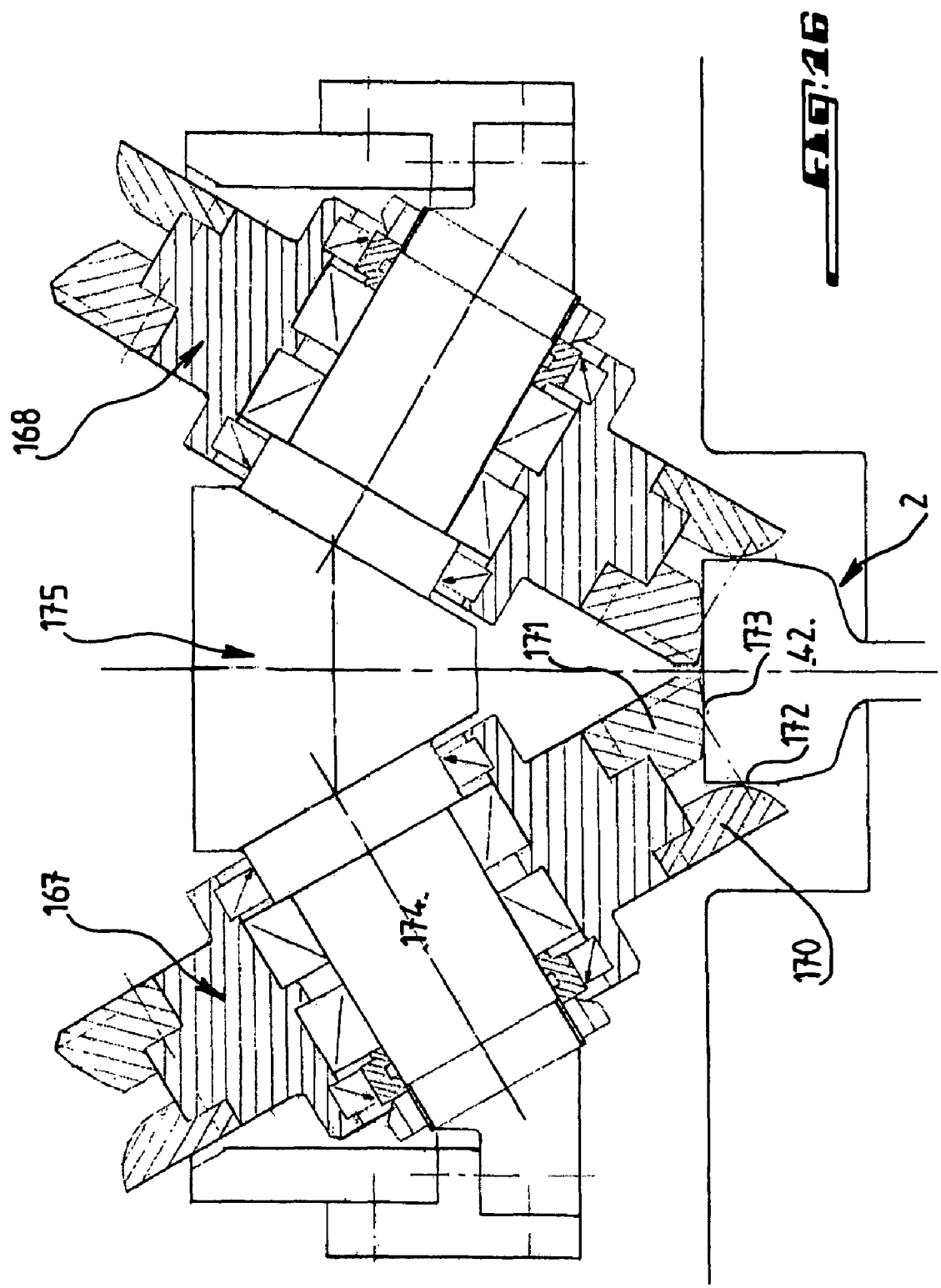

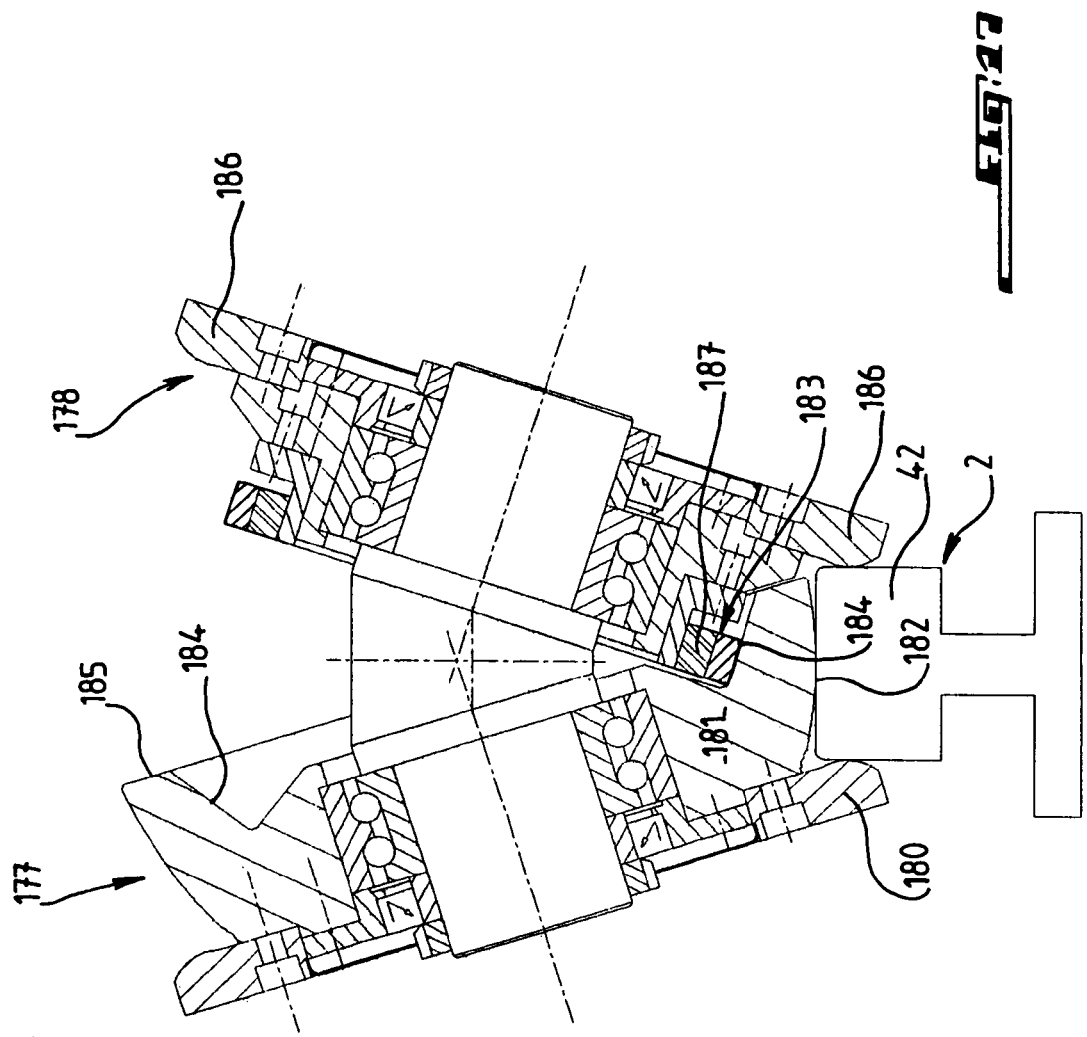

SYSTEM FOR GUIDING A VEHICLE ALONG AT LEAST ONE GUIDING RAIL

The invention relates to a system for guiding a vehicle along at least one guiding rail, having a rolling surface and at least one side surface of which constitutes a guiding surface, of the type which has a guiding roller device configured to cooperate with the rolling surface and the side surface and having a rolling bearing part intended for being in rolling contact by its peripheral surface with the upper rolling surface of the rail and at least one side part capable of coming into contact with the side surface of the rail facing it.

BACKGROUND

Systems of this type are already known. These systems are suitable for cooperating with one or two rails, and their roller device has a rolling bearing surface and at least one side part in the form of a flange which is rotationally connected with the bearing part, projects radially towards the exterior, and comes in contact with the guiding surface of the rail.

This known guiding system has the disadvantage that the contact of the side surfaces of the flanges forming the cheeks with the surfaces of the rail head facing them involves friction between the surfaces in contact and thus wear and tear on both the rail and the roller.

The invention aims to propose a guiding system that palliates this disadvantage.

SUMMARY OF THE INVENTION

To attain this objective, in the roller device according to the invention the rolling part and the side part are configured such that the side part, at its point of contact with the rail, has the same speed as the central part at the site of its rolling surface on the rail.

According to one characteristic of the invention, the roller device has at least one rolling support roller and at least one side roller forming the side part and of which the diameter and shape of the side surface intended for coming into contact with the rail are chosen such that the side roller, at its point of contact with the rail, has the same speed as the central support roller at the site of its rolling surface on the rail.

According to one characteristic of the invention, the roller device has at least one rolling support roller and at least one side roller forming said side part and of which the diameter and shape of the side surface intended for coming into contact with the rail are chosen such that the side roller, at its point of contact with the rail, has the same speed as the central support roller at the site of its rolling surface on the rail.

According to another characteristic of the invention, the vehicle is guided along two parallel guiding rails, of which the exterior side surfaces constitute the guiding surfaces, characterized by the fact that it has a support roller and a side roller for each guiding rail.

According to yet another characteristic of the invention, the roller device has three rollers, a central roller and two side rollers forming said side parts and of which the diameter and the shape of the side surface intended for coming into contact with the rail are chosen such that the side rollers, at their point of contact with the rail, have the same speed as the central support roller at the site of its rolling surface on the rail.

According to yet another characteristic of the invention, the areas of contact of the side rollers have, in radial section, a convex profile, advantageously in an arc shape, and the contact surfaces of the rail are essentially planar.

According to yet another characteristic of the invention, a side roller is rotationally synchronized with the central roller.

According to yet another characteristic of the invention, the means of synchronization of the rotation speed of a side roller with the rotation speed of the central roller comprises teeth, associated respectively with the side roller and with the central roller, which mesh with one another.

According to yet another characteristic of the invention, a set of teeth is mounted on its support by a means allowing sliding between the teeth and the support when a relative force exceeding a predetermined threshold is exceeded.

According to yet another characteristic of the invention, the means of synchronization of the rotation speed of a side roller with the rotation speed of the central roller is the belt-and-pulley type.

According to yet another characteristic of the invention, the means of synchronization of the rotation speed of a side roller with the rotation speed of the central roller comprises a ring made out of a nondeformable solid material which comes in contact with a bearing surface of the central roller so as to ensure the rotation of the side roller by friction with the central roller.

According to yet another characteristic of the invention, the central roller is formed by a ring rotating freely and maintained by a support device connected to the support shaft.

According to yet another characteristic of the invention, the support device comprises rollers for support of the ring that come in rolling contact with an internal annular surface of the ring.

According to yet another characteristic of the invention, the system has two rollers, each of which has a radial external part intended for coming into contact with a side surface of the head of the rail and a radial internal part intended for coming into contact with the upper surface of the rail head, the two rollers being arranged in a V-shaped configuration.

According to yet another characteristic of the invention, the system has two rollers, each of which has a radial external part intended for coming into contact with a side surface of the head of the rail and a radial internal part intended for coming into contact with the upper surface of the rail head, and one of the rollers has a peripheral ring intended for coming into contact with an annular surface of the other roller so as to ensure the rotation of the roller by friction with the roller.

BRIEF DESCRIPTION OF DRAWING FIGURES

The invention will be better understood and other aims, characteristics, details and advantages of it will appear more clearly in the course of the following description that references the appended drawings, which are given by way of example to illustrate several embodiments of the invention and in which:

FIG. 13 is a section view, perpendicular to the rail, of yet another embodiment of the guiding system according to the invention;

FIG. 14 is a section view according to line XIV-XIV of FIG. 13;

FIG. 15 is a section view, perpendicular to the rail, of yet another embodiment of the invention;

FIG. 16 is a section view, perpendicular to the rail, of yet another embodiment of the guiding system according to the invention;

FIG. 17 is a section view, perpendicular to the rail, of yet another embodiment of the guiding system according to the invention.

DETAILED DESCRIPTION

Figure 1:
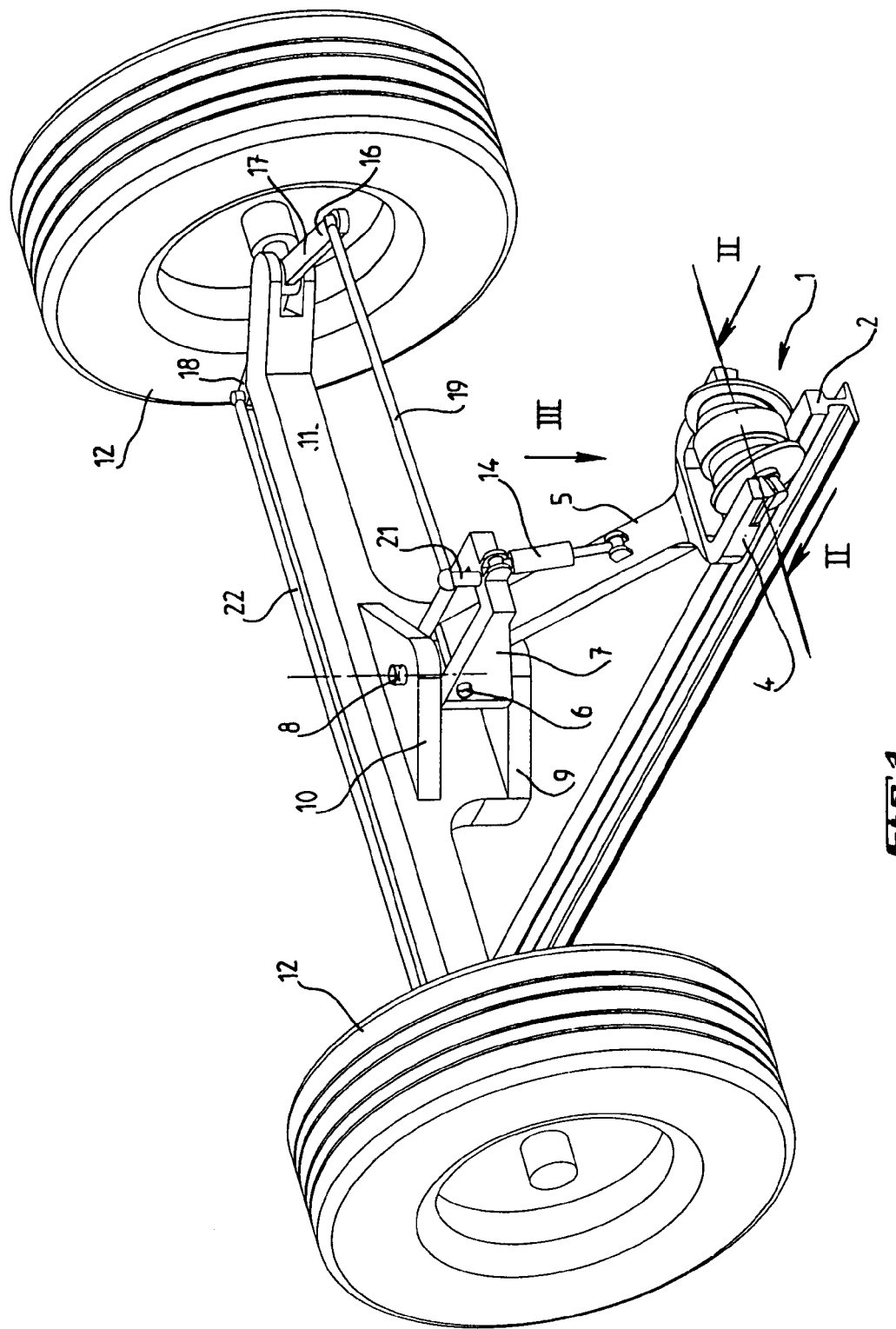
FIG. 1 is a perspective view of a guiding system according to the invention.

FIG. 1 illustrates a guiding system according to the invention that makes it possible to guide a vehicle advantageously on tires rolling on a roadway, using a single rail.

In the example represented, the system has roller device 1 engaged on rail 2 that constitutes a mechanical contact roller mounted at fork-shaped end 4 of arm 5 whose other end is mounted so as to pivot around horizontal shaft 6 on a part within the form of frame 7 which is itself mounted so as to pivot around vertical shaft 8 fixed between two parallel support brackets 9 and 10 associated with axle 11 for support of two wheels of the vehicle equipped with the guiding system according to the invention. By means of load maneuver and application system 14 inserted between support frame 7 and arm 5, the latter can be made to pivot around shaft 6 in order to bring it in or out of engagement with rail 3. System 14 allows roller device 1 to be applied on the rail with an adjustable force.

Provided at the end of each axle is pivoting lever 16 with two arms 17, 18, the pivot pin of which is supported by the axle and contains, at the site of the pivot pin but oriented perpendicularly, the axis of rotation of wheel 12. Thus, lever 16 forms a triangle of orientation of the wheel. As FIG. 1 clearly shows, connecting rod 19 is inserted between front end 21 of support frame 7 and the free end of one of the arms, in the present case arm 17, of guiding triangle 16. Connecting rod 19 extends parallel to axle 11. Another connecting rod 22 interconnects the free ends of the other two arms 18 of the two guiding triangles 16.

It is easily understood that any change in orientation of the rail, such as a curvature of rail 2, is transmitted by roller device 1 to arm 5 and brings about a pivoting of the latter about its vertical shaft 8, which leads to a change in orientation of wheels 12 by the intermediary connecting rods 19, 22 and guiding triangles 16.

Different embodiments of roller device 1 according to the invention will be described below with reference to FIGS. 2 to 10.

Figure 2:
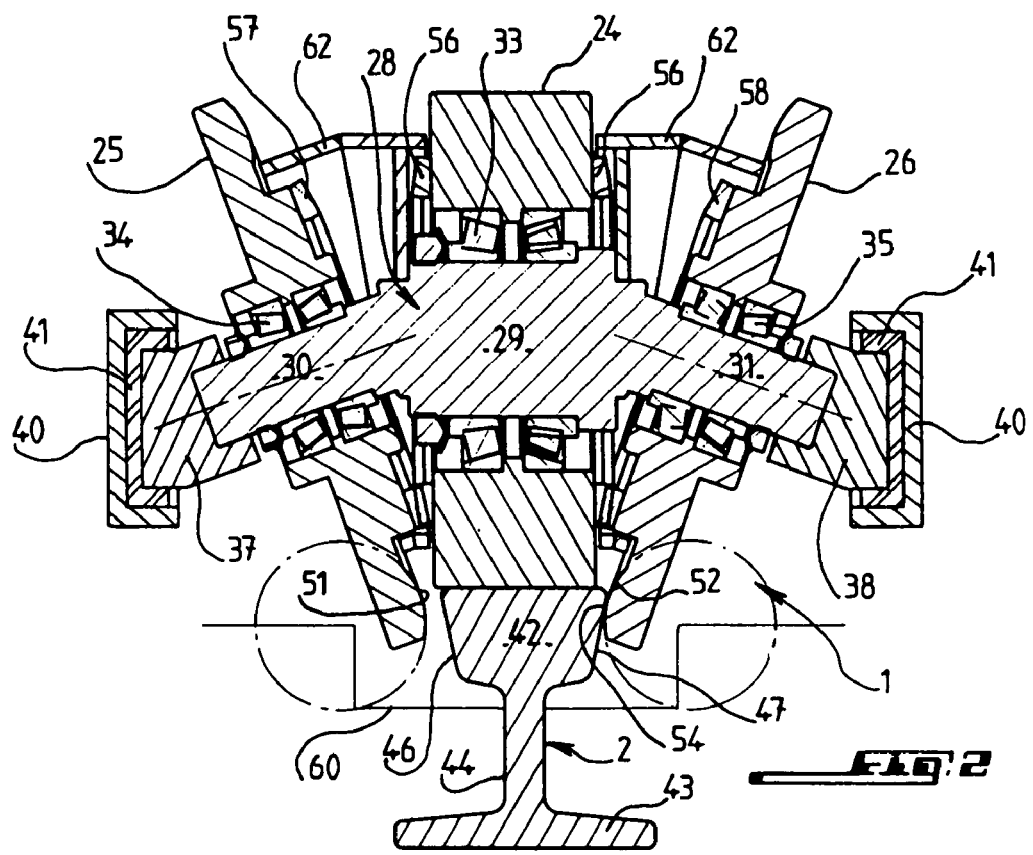
FIG. 2 is a section view in the vertical plane through line II-II of FIG. 1.
Figure 3:
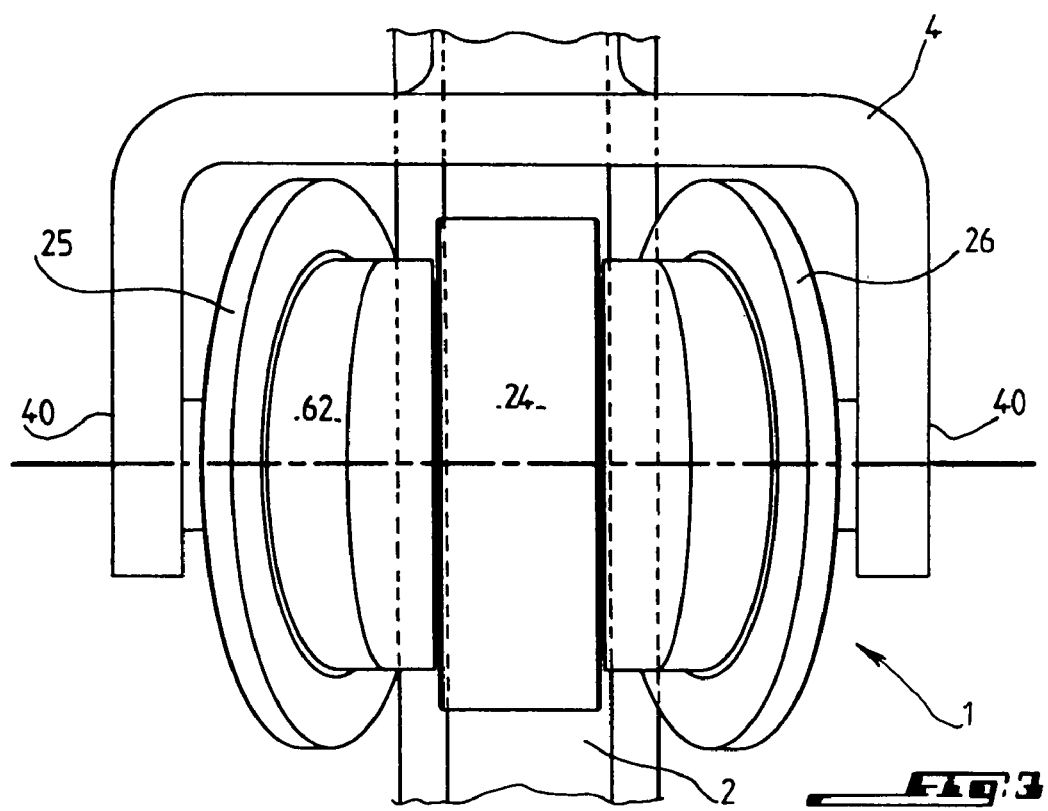
FIG. 3 is a view of the roller device in the direction of arrow III-III of FIG. 1.

FIG. 2 shows a first variation of a first embodiment of roller device 1 according to the invention. This device has three separate rollers, namely central roller 24 and two side rollers 25 and 26 on either side of it. The three rollers are mounted so as to rotate on crankshaft 28 produced as a single piece, which has central part 29 for support of central roller 24 and a part on the right and on the left, respectively 30 and 31. Parts 30 and 31 are inclined relative to the axis of central part 29 so that rollers 25 and 26 are inclined, relative to central roller 24, towards one another at the site of rail 2. Rollers 24, 25, 26 are mounted on their shaft parts, 29, 30 and 31, respectively, via rolling bearings, 33, 34, 35 respectively. Inclined shaft parts 30, 31 are held in support parts 37, 38 engaged in limbs 40 of fork 4, with insertion of elastomer layer 40, 41.

Rail 2 in the example represented has head 42 as a part connected to base 43 by narrower intermediate part 44. Head 42 of the rail has planar horizontal surface 45 and two side surfaces 46, 47 that are inclined towards one another in the direction of base 43.

Central roller 24 has cylindrical exterior surface 49 by which it comes in rolling contact with upper horizontal surface 45 of rail 2. Side rollers 25, 26 have a larger diameter than the diameter of central roller 24 so that radial external parts 51, 52 of the side surfaces oriented towards rail 2 project at the site of the rail, beyond peripheral surface 49 of central roller 24 so that they can come into contact with the inclined side surfaces, respectively 46, 47, of head 42 of the rail. The separation of side contact surfaces 51, 52 of rollers 25, 26 is greater than the width of rail head 42 so that when one surface is in contact with the rail head, the other is separated from the head, as FIG. 2 clearly shows.

According to an essential characteristic of the invention, annular contact surfaces 51, 52 are convex and advantageously have, according to the radial section in FIG. 2, an arc shape, which is diagrammatically indicated with broken lines. Consequently, the contact between surfaces 51, 52 of the rollers and side surfaces 46, 47 is essentially a pin-point and therefore frictionless contact. In the figure, the pin-point contact area of convex surface 52 of roller 26 with side surface 47 of rail head 42 is designated by 54. Furthermore, the radial distance between the axes of inclined arm parts 30, 31 and the areas of contact, such as area 54 of convex surfaces 51, 52 of rollers 25, 26, is equal to the radial separation between the axis of middle part 29 and peripheral rolling surface 49 of central roller 24.

In order to prevent any differential speed between roller 24 rolling continually on rail 2 and side rollers 25, 26 during contact between the rollers and rail head 42, after a certain time of no contact the roller device has a means for synchronization of the rollers by driving the side rollers with the central roller. In the case of FIG. 2, this driving is brought about by means of a gear. For this purpose, central roller 24 has, on each of its side surfaces, a ring of radial teeth, and each side roller 25, 26 has, on its surface facing it, a complementary toothed ring, respectively 57, 58. As the figure shows, the teeth are tapered, and each set of side-roller teeth meshes with a set of central-roller teeth at the site of their part just above the rail.

It should also be noted that FIG. 2 shows at 60 the groove in the roadway that houses head 42 of rail 2, and the width of which is chosen so as to allow the engagement of the lower radial external parts of side rollers 25, 26.

It is observed, moreover, that in order to protect roller device 1 from penetration by foreign bodies and dirt, the device is provided with protective casing 62, which covers and surrounds the space between the surfaces facing one another of the side rollers and of the central roller.

Figure 4:
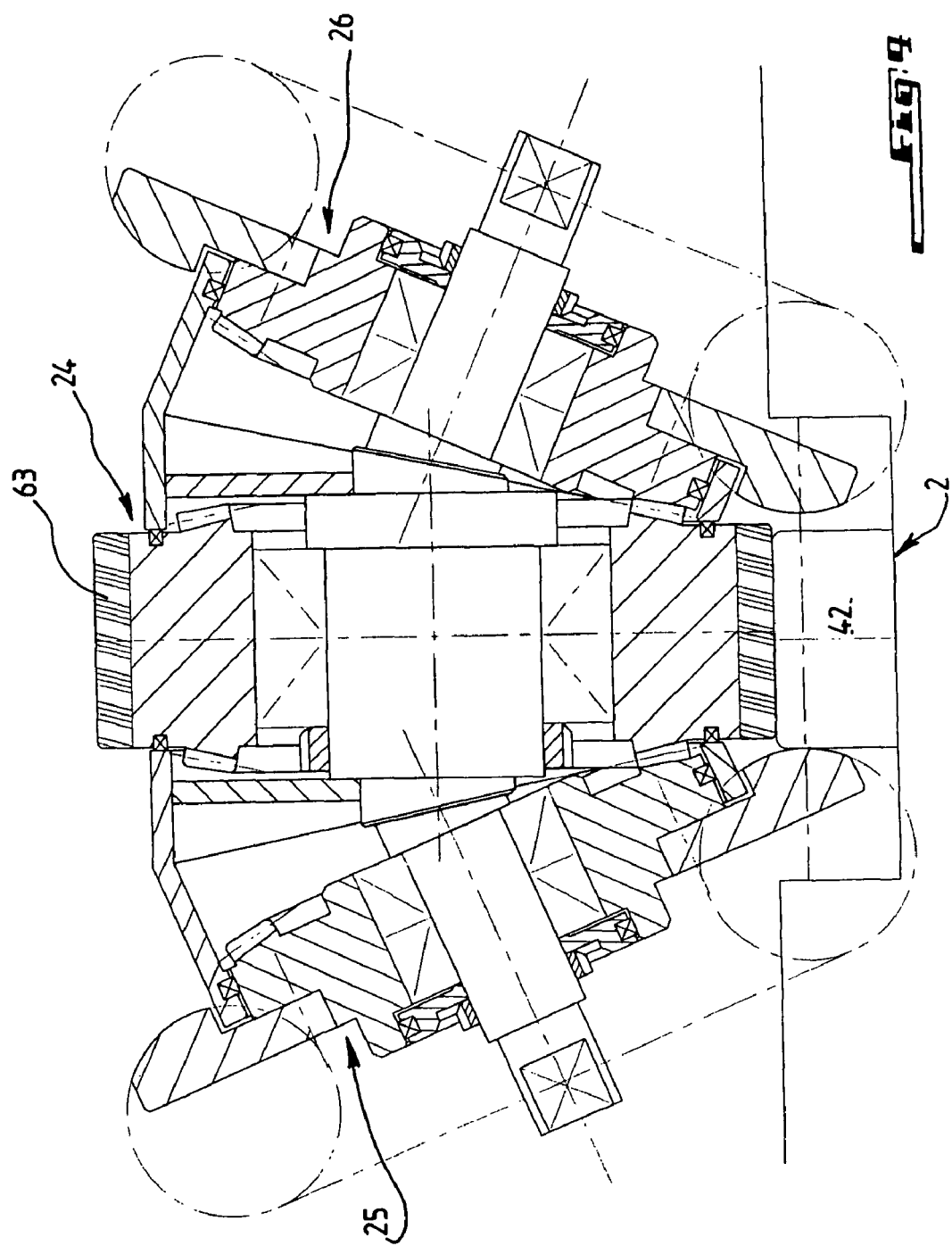
FIGS. 4 to 7 are section views similar to FIG. 2 and show three implementation variations of a first embodiment of the invention.

FIG. 4 shows another execution variation of roller device 1 of FIG. 2. In this implementation variation of device 1, central roller 24 has, on its periphery, strip 63 made of synthetic material whose exterior cylindrical peripheral surface constitutes rolling surface 42 of the roller. This layer of synthetic material inserted between the central roller and the rail provides sound insulation.

Figure 5:
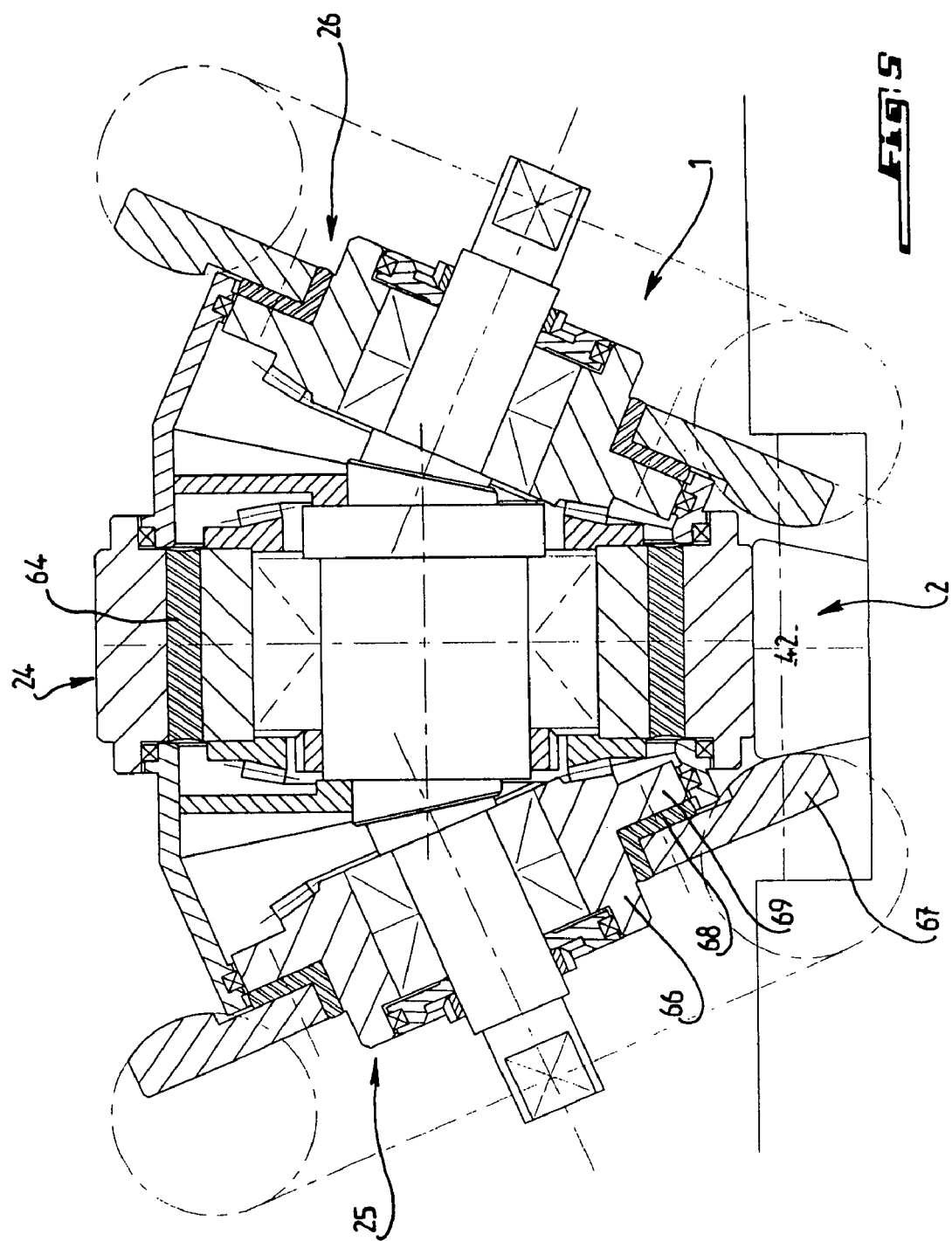

FIG. 5 shows another implementation possibility of the sound insulation. In this case, central roller 24 is provided with elastomer layer 64 for sound insulation situated inside of the roller extending over the whole width of the roller, parallel to its axis. In order also to provide sound insulation at the site of side rollers 25, 26, these rollers are produced in two parts, a central part in the form of hub 66 and annular exterior part 67, with insertion of insulating elastomer layer 68 between these two parts. Given that the hub has radial projection 69 beyond the lower edge of exterior annular part 67, insulating layer 68 has an L-shaped profile so that the sound insulation effect is optimal.

Figure 6:
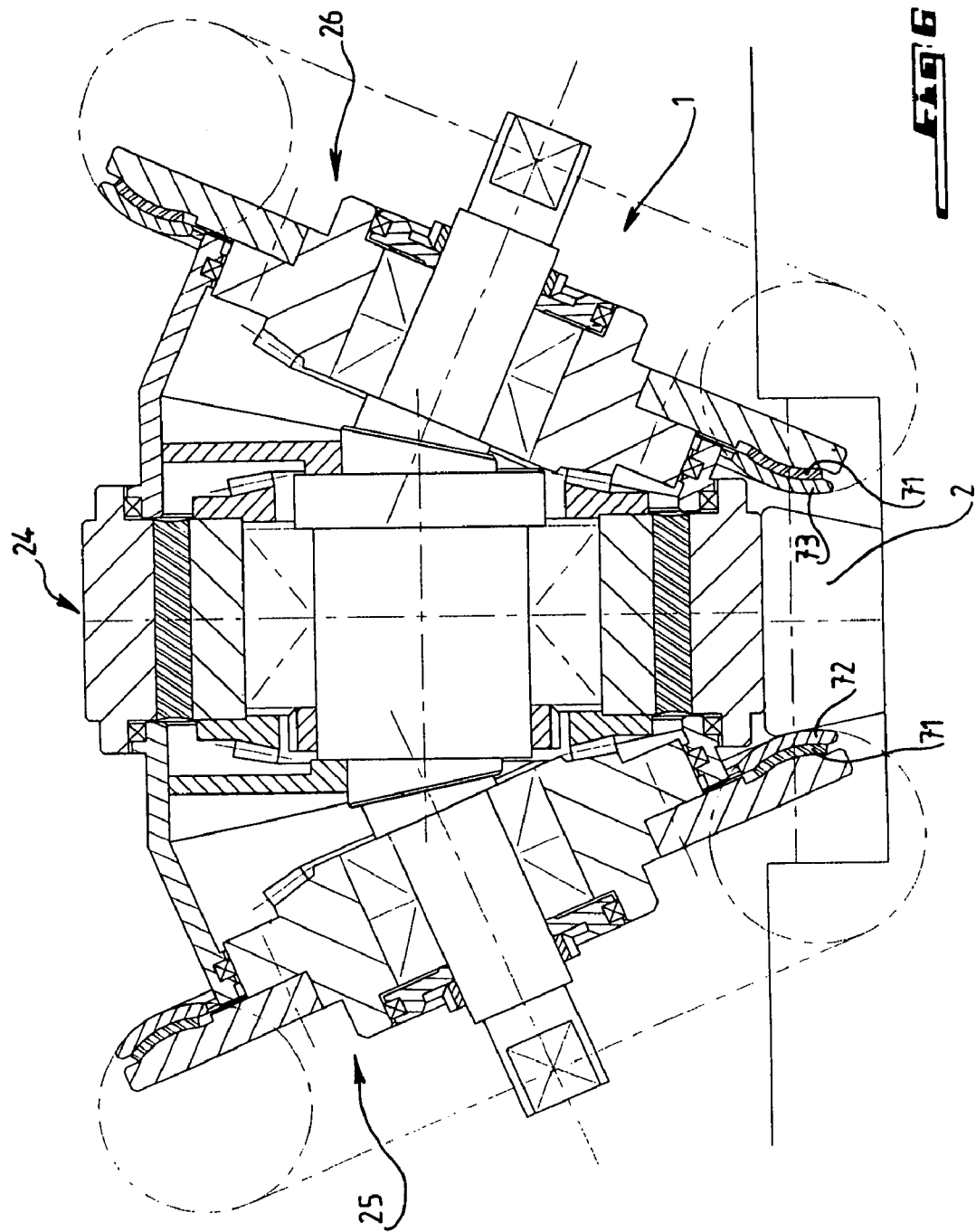

In the implementation variation of the first embodiment represented in FIG. 6, a layer of sound insulation noted 71 is arranged under the area of contact of side rollers 24, 25 with side surfaces 46, 47 of rail head 42, and the areas of contact are, for this purpose, produced as separate annular elements, curved as a consequence. These elements 72, 73 are connected onto the rollers, with insertion of sound insulating layers 71.

Figure 7:
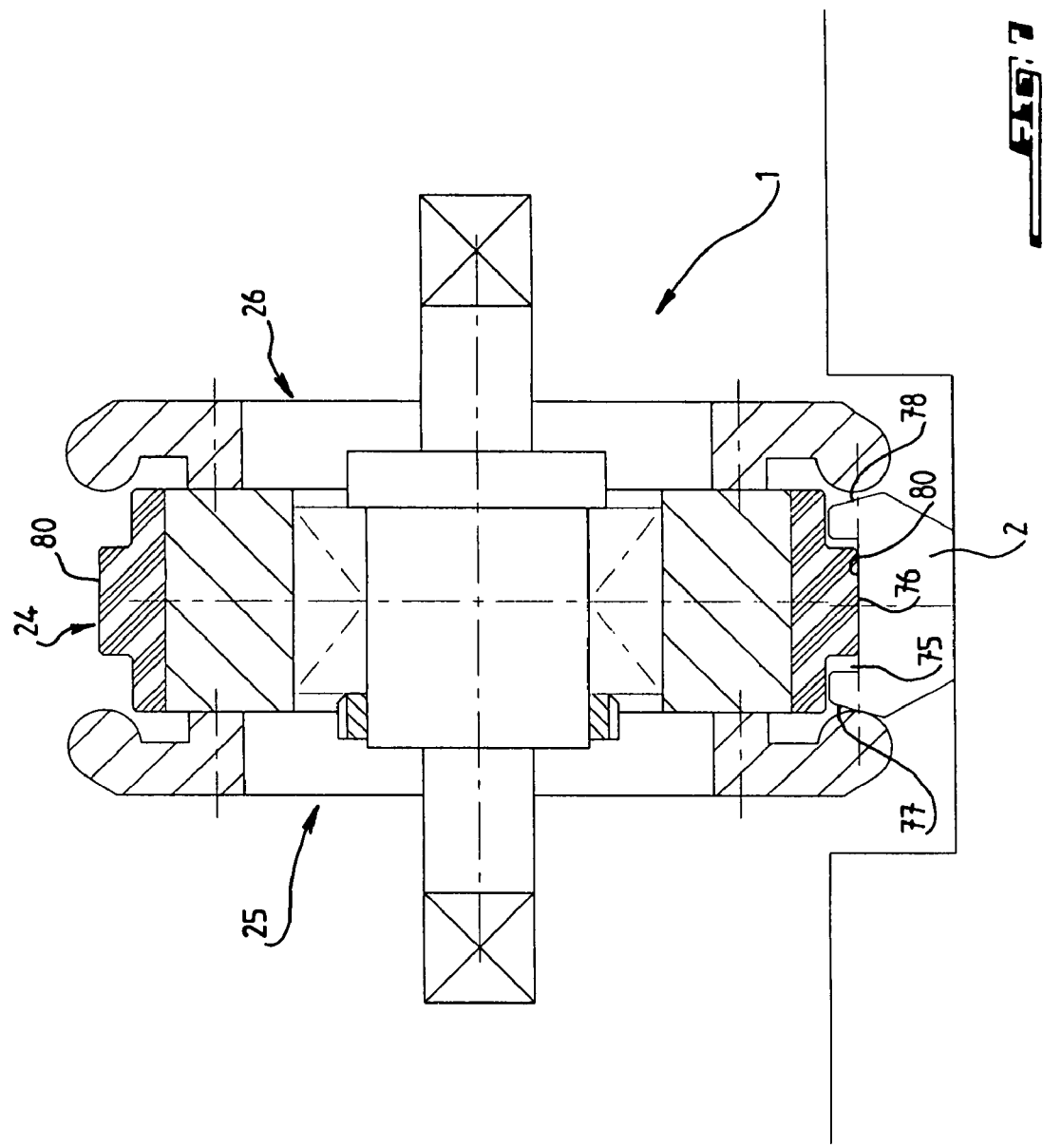

FIG. 7 shows another embodiment of roller device 1 of the invention. In this case, the upper surface of the rail head is no longer planar as in FIGS. 1 to 6, but rather has circumferential recess 75, symmetrical with respect to the longitudinal vertical plane of symmetry, whose bottom 76 is planar and constitutes the rolling path. The exterior side contact surfaces of the head 77, 78, are planar and inclined away from one another toward the roadway. Inclined surfaces 77, 78 extend toward the base of rail 2 beyond the level of bottom 76.

In order to be able to roll on bottom surface 76 of the rail, roller 24 has a stepped peripheral surface whose projecting middle part constitutes rolling tread 80.

In this embodiment, side rollers 25, 26 can be rotationally connected with central roller 24 and extend in a plane parallel to the plane of the central roller. In other words, the rollers are no longer inclined as in the first embodiment. Consequently, shaft 28 is a straight shaft. By making side contact surfaces 51, 52 of the side rollers come into contact with contact surfaces 77, 78 of rail head 42 at the bottom 76 of the rail, the distances of the contact points 54 from the axis of the side rollers is identical to the distance of rolling surface 80 of the central roller from its axis of rotation, which has the consequence that the speeds of the side rollers at their contact point 54 and of the central roller at the site of its rolling surface 80 are identical.

Figure 8:
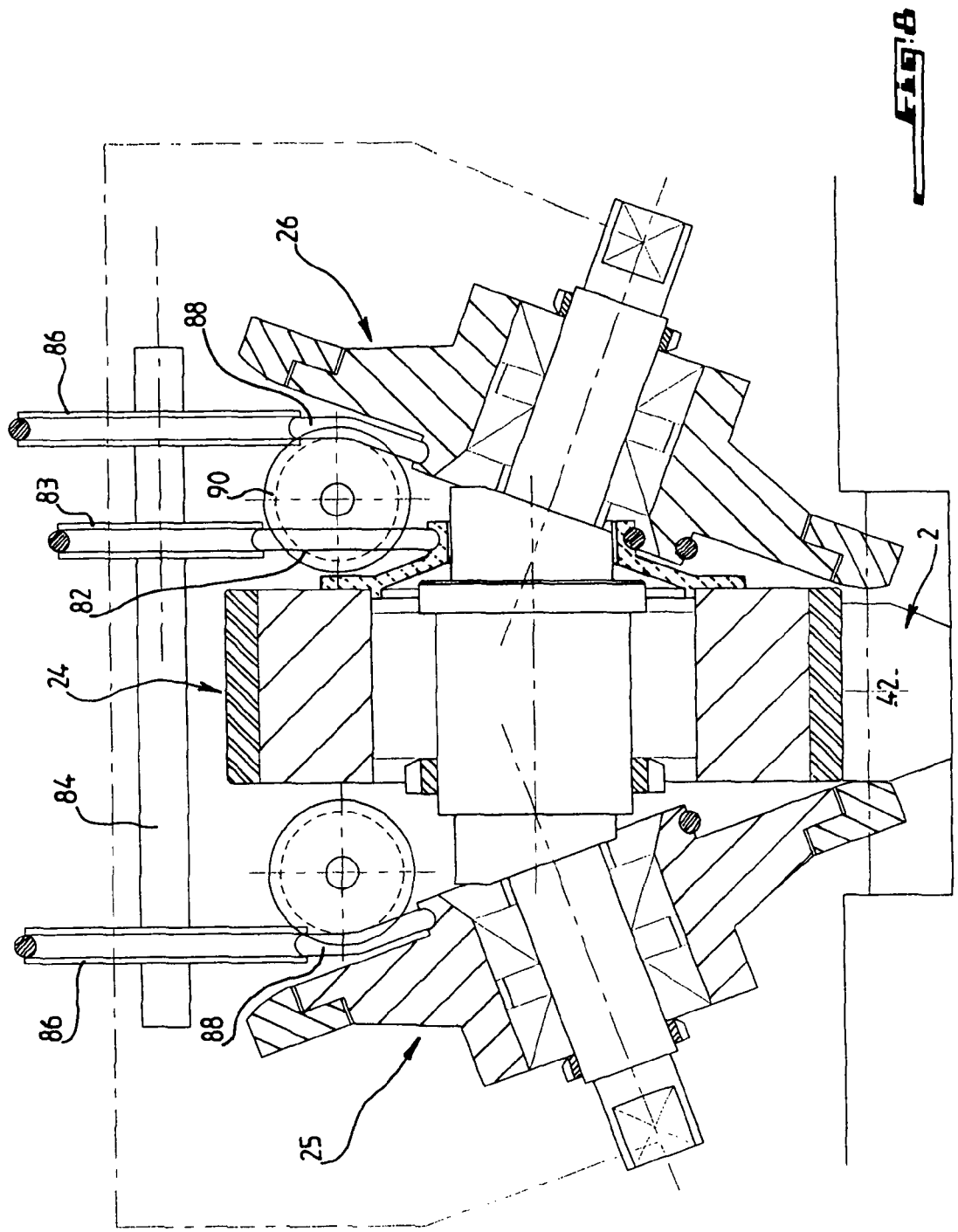
FIG. 8 is a section view similar to FIG. 2, of a second embodiment of a roller device according to the invention.

FIG. 8 illustrates a third embodiment of roller device 1 according to the invention. This embodiment has in common with FIGS. 2 to 5 the fact that side rollers 25, 26 are inclined and independent rollers. This embodiment is distinguished from the first by the means for synchronization of the rotations of these side rollers, from central roller 24. The rotation of the side rollers by the central roller occurs by means of a device with belts and pulleys. The rotation of central roller 24 is transmitted by first belt 82 to pulley 83, which is rotationally connected with shaft 84 bearing two other pulleys 85, 86, which are also rotationally connected with shaft 84. Each of the two pulleys 85, 86 transmits the rotation of shaft 84 via belt 87, 88 to the corresponding side roller 25, 26. Return pulleys 89, 90 are provided so as to ensure the appropriate orientation of the belts at the site of the rollers.

Figure 9:
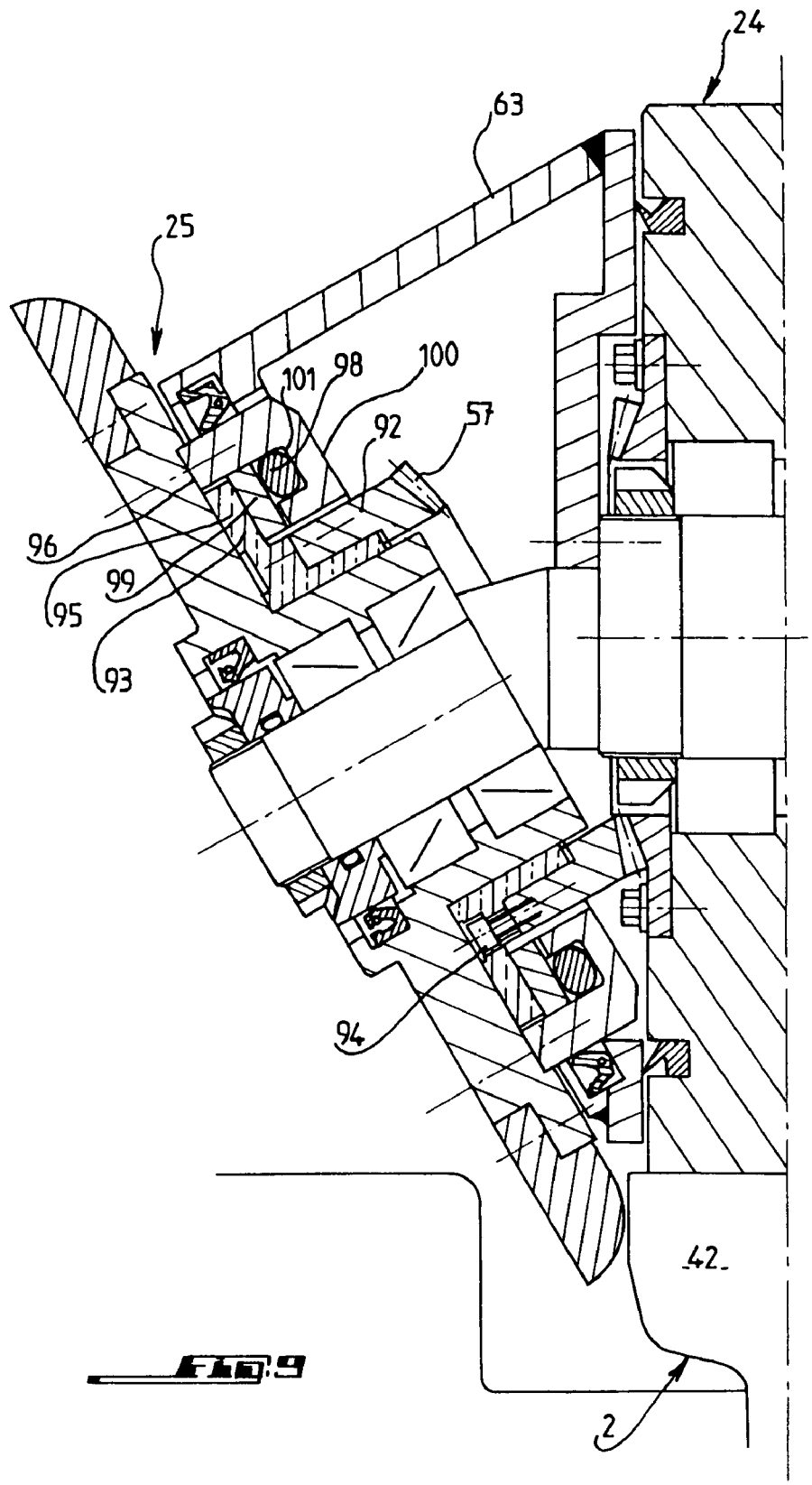
FIG. 9 is a section view similar to FIG. 2, of an improvement in the embodiment of FIG. 2.

FIG. 9 illustrates a possibility for performing the synchronization also by gearing of the inclined rollers. For this purpose, rack rings 57, 58 are mounted, constituting bevel gears on the internal side surfaces of side rollers 25, 26 so that in case of the presence of a resistance to the rotation of a ring greater than a threshold value, the ring can slide over its support surface. For this purpose, as FIG. 9 shows, bevel gear 57 has axial annular extension 92 on which annular part 93, made of bronze, for example, which has an L-shaped cross section, is fastened by screw 94. Free limb 95 of part 93 is pressed against side support surface 96 of roller 25 by spring element 98 produced, in the example represented, as a torus made of elastomer, with insertion of a washer 99, spring element 98 being housed in connected annular part 100. This part has a cross section in the shape of an L, one limb of which is attached on support surface 96 of the roller, while the edge of the other limb is curved so as to form groove 101 for housing of spring element 98.

Figure 10:
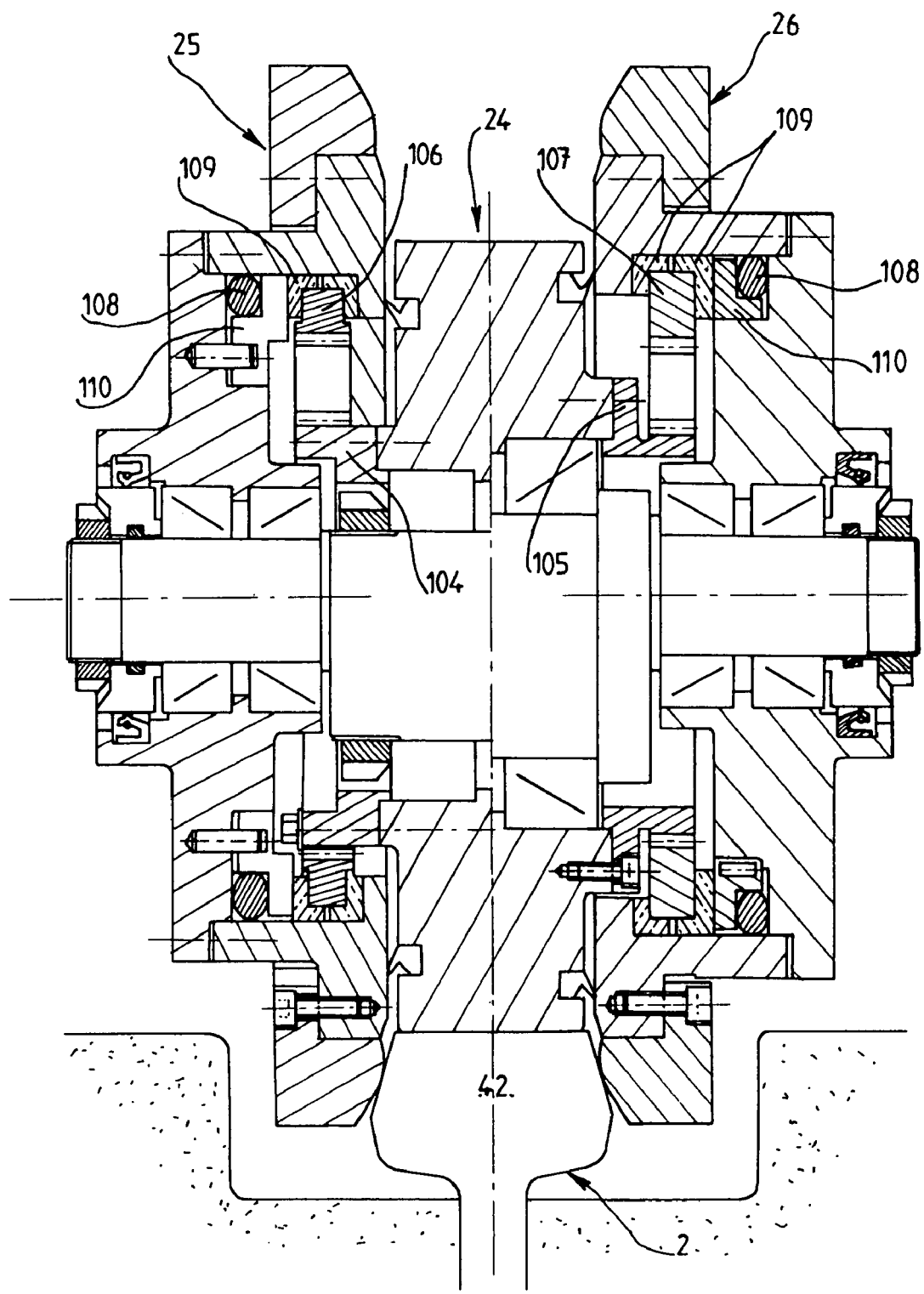
FIG. 10 is a section view similar to FIG. 2, of a fourth embodiment of the roller device according to the invention.

FIG. 10 illustrates a fourth embodiment of roller device 1 according to the invention, in two slightly different variations which are indicated on the left and on the right of the axis of symmetry of central roller 24.

In this embodiment, side rollers 25, 26 are independent of roller 24 but are mounted so as to rotate on shaft parts 30, 31, which are parallel to shaft part 28, for support of the central roller. This roller device is suitable for rolling on rail head 42 whose rolling surface is planar as in the case of FIG. 2. In contrast, the side surfaces by which the side rollers are intended to come into contact with the rail are inclined in the manner represented in FIG. 7 and therefore bear the references 77 and 78. So that the rotation speeds of the rollers at points of contact 54 with rail head 42 can be identical to the rotation speed at the site of peripheral rolling surface 49 of central roller 24, on one hand, and so that the rotational synchronization of side rollers 25, 26 on central roller 24 can be ensured, on the other hand, the axes of rotation of the side rollers are offset from the axis of rotation of the central roller, and the latter has a toothed ring 104, 105 on each side on its periphery, which meshes with inwardly-toothed ring 106, 107 associated with side rollers 25, 26. Toothed rings 104, 105 of the central roller, on one hand, and rings 106, 107 of the side rollers, on the other hand, are not concentric and mesh with one another on the side of rail 2 with a certain speed-reducing ratio. So as to ensure a certain flexibility of the rotational synchronization of the rollers, each of rings 106, 107 is mounted on its roller via two plates 109, made of bronze, for example, in such a way as to obtain a connection by friction between the roller and the ring.

The bronze friction plates are applied against the side surfaces of the ring respectively under the effect of spring element 108 inserted between a support surface of the roller and added annular element 110 which rests on one of plates 109, the other plate being arranged between the ring and another bearing surface connected with the roller.

Figure 11:
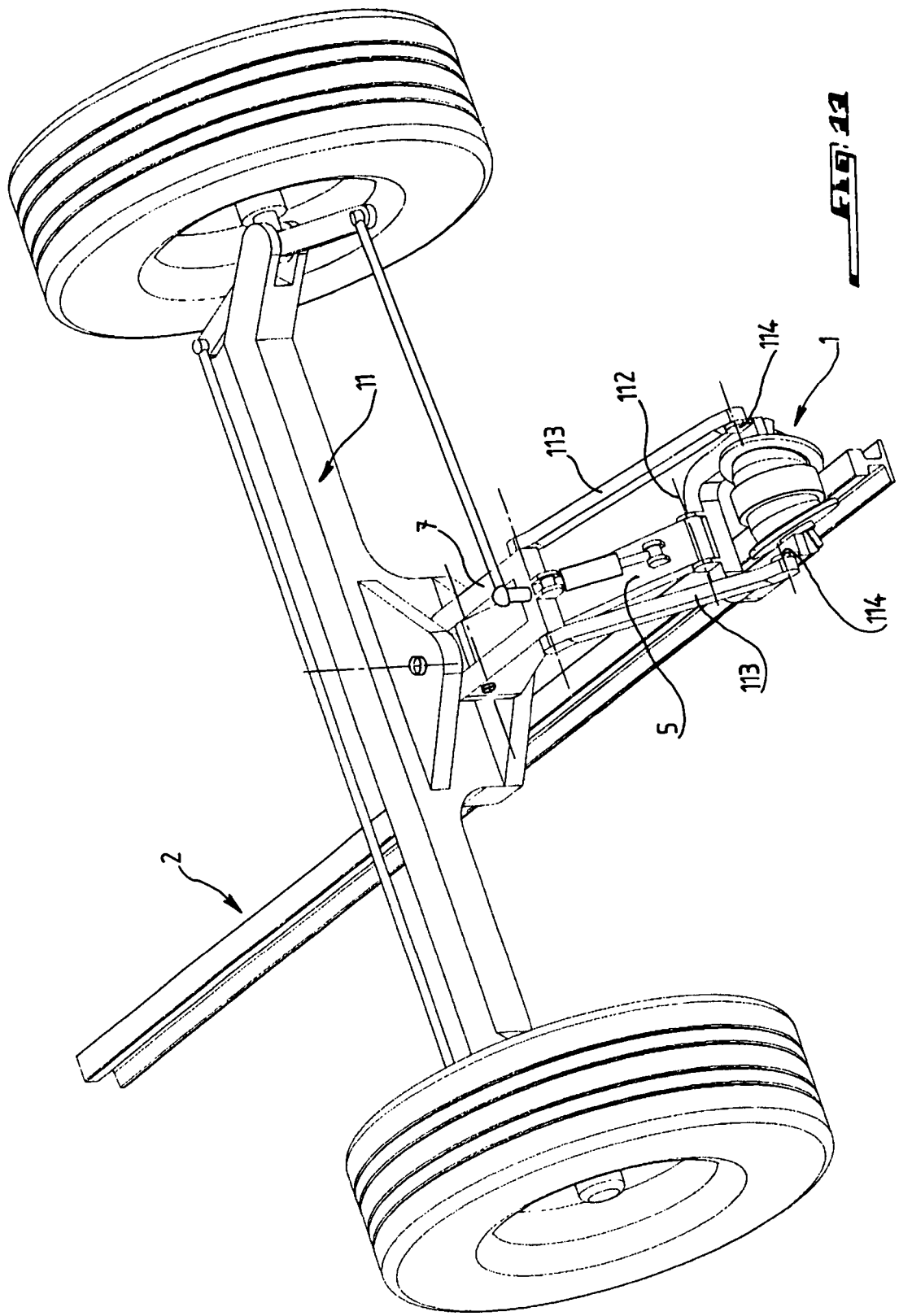
FIG. 11 is a perspective view of another embodiment of the guiding system according to the invention.

FIG. 11 illustrates another embodiment of the support arrangement for roller device 1. The arrangement according to FIG. 11 is distinguished from that shown in FIG. 1 by the fact that arm 5 is part of a parallelogram, which has the advantage that roller device 1, during its vertical movement, always moves by translation without any angular movement. For this purpose, fork 4 for holding the roller device is joined at 112 to arm 5, and two additional arms 113 are provided that are joined by one end to tabs 114 situated at the front of fork 4 and by their other end to support frame 7.

The guiding system according to the invention has been described in the preceding by means of several embodiments given only as examples. Multiple modifications can nevertheless be made to this system without leaving the scope of the invention.

The preceding description showed that the guiding system for a vehicle, according to the invention, is made up of a mechanical actuating contact roller which is, on one hand, attached to the steering elements of the vehicle and which, on the other hand, rolls on the rail. The system is particularly suitable for equipping streetcars that run on tires and on rails. When such a streetcar enters a curve, the roller rolling on the rail is deflected towards the inside of the curve. Since the roller is connected to an arm, the arm pivots around its vertical axis of rotation. Assuming a certain angle, the arm influences the orientation of the wheels of the vehicle in such a way as to reduce the angle of the arm. This kinematic chain makes it possible to transmit the forces necessary for changing direction, the direction-change information being assumed on the side surfaces of the rail. The side rollers of this device make it possible to take up the forces without bringing about friction. In effect, the rollers behave like wheels. The contact between the rail and the rollers is a pin-point and frictionless contact. The invention ensures continual synchronization of the rollers. In order to ensure a certain flexibility of the synchronization and to allow, if necessary, immobilization of one of the two side rollers or the set of rollers in case of the presence of an obstacle, the invention proposes a transmission by adhesion, several implementation possibilities of which have been described as examples. Given that the contact between the central roller and the rail, on one hand, and between the side rollers and the rail, on the other hand, does not occur by friction but only by rolling, the system generates only a small amount of noise. This noise is further reduced by inserting a layer of elastomer between the rolling treads of the central roller and of the side rollers and the support of the roller device, the layer of elastomer functioning as sound insulation. The use of inclined rollers is advantageous because it requires only a narrow slot in the roadway.

Figure 12:
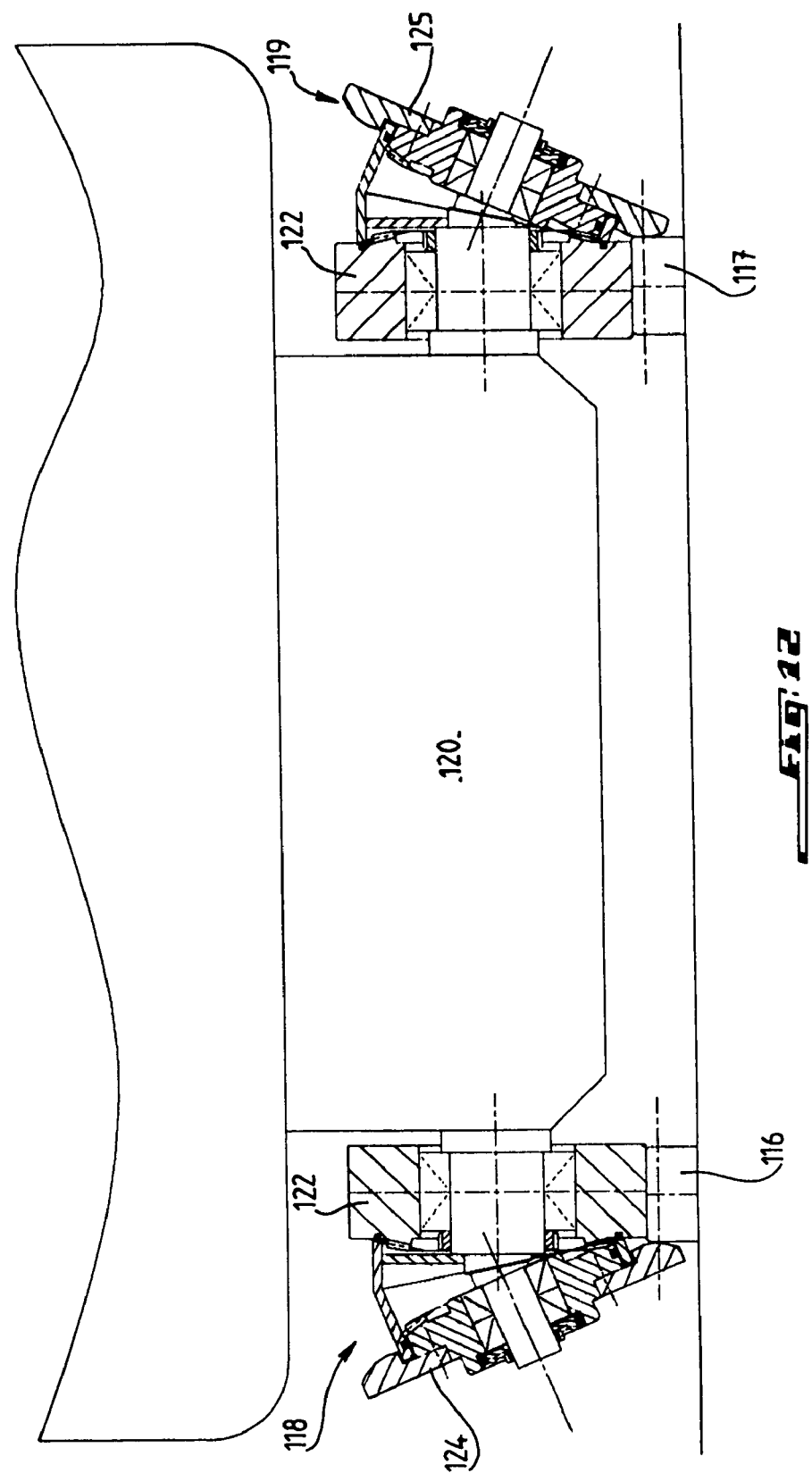
FIG. 12 is a partial vertical section of another embodiment of the invention.

The invention has been described in the preceding by way of example in several embodiments and execution variations suitable for cooperating with a single guiding rail. Of course, the invention also encompasses systems designed for cooperating with several rails, for example, two rails as illustrated in FIG. 12. In this figure are the two rails 116, 117, the vehicle being equipped with two roller devices 118, 119 situated on either side of the vehicle 120. Each roller device 118, 119 corresponds to half of roller device 1, that is, it has rolling support roller 122 corresponding in its configuration and operation to roller 24 of FIGS. 2 to 10 and an inclined side roller 124, 125, whose configuration and operation correspond, respectively, to the two side rollers 25 and 26. Rollers 118 and 119 can both have the structural and operational characteristics presented in the description of roller device 1 in its different execution variations. It is observed that side rollers 124, 125 cooperate with the respective exterior side surfaces of the rails in the manner that side rollers 25, 26 cooperate with guiding rail 2.

In order to illustrate the large number of implementation possibilities of the invention, four additional embodiments will be described below with reference to FIGS. 13 to 17.

The embodiment represented in FIGS. 13 and 14 has three roller components intended for coming into contact with single rail 2, namely central roller component 128 intended for rolling on the upper surface of the rail and two side rollers 129 and 130, each intended for coming in rolling contact with a side surface of head 42 of the rail. The three roller components rotate around crankshaft 132, the central component around central portion 133, and the two side rollers 129, 130 around a shaft portion, respectively 134, 135.

Central component 128 is a ring, which is kept within its portion 133 of the shaft of rotation via device 137. This device has two parallel plates 138, 139 connected with shaft portion 133 via two plates 140, 141 made of an elastically deformable material, arranged on either side of central shaft portion 133 parallel to the rail, in order to obtain a dampening effect and to apply pre-stressing on ring 128. Each of plates 138, 139 has, on its exterior surface, in its upper part, two casters 143, 144 arranged on either side of the vertical axis of symmetry of the roller, as seen in FIG. 14, via shaft end 146 inclined upward and connected with the corresponding plate.

As FIG. 14 shows, the two casters 143, 144 borne by plate 138 or 139 are arranged such that they come into contact with radial internal and inclined peripheral surface 145 or 146 of ring 128 in order to form a V whose summit is in the middle. The inclination of the contact surfaces is parallel to the inclination of support shafts 147 of the casters that, as seen, are inclined as a consequence so as to provide a four-point support in the upper part of the ring.

Each side roller 129, 130 has hub 148 which, at the free end of shaft portion 134, 135 and rotationally connected with the hub, has ring 149 whose convex radial exterior part 150 comes in rolling contact with one of the two side surfaces of head 42 of rail 2. At the axial interior end, hub 148 has ring 153 rotationally connected with the hub and produced from steel or any other material. As FIG. 13 shows, ring 153 is arranged such that its peripheral surface 154 comes in contact with inclined peripheral internal surface 145, 146 of ring 128 in order to create another two support points in the interior part of the ring as close as possible to the rail.

According to an advantageous characteristic of the invention, side rollers 129, 130 are rotated by friction with central ring 128 due to the contact of rings 153 of the two rollers on the internal surface of the ring. A speed-reducing ratio between ring 153 and surface 146 make it possible to have the same linear speed at the different points of contact.

The embodiment represented in FIG. 15 has three rollers, central roller 155 and two side rollers 156 and 157, all three cooperating with the same rail 2, the central roller being in rolling contact on the upper surface of the rail, and the two side rollers coming into contact with the side surfaces of the head of the rail, as described above for the preceding embodiments.

The particularity of the embodiment according to FIG. 15 lies in the fact that the rotational synchronization of side rollers 156 and 157 occurs by contact of ring 159 of each roller, similar to ring 153 of the embodiment in FIGS. 13 and 14, but in this case in rolling contact with inclined and annular bearing surface 161, provided on the corresponding side of central roller 155 as seen in FIG. 15, this central roller having inclined annular contact surface 161 on each side.

Each ring 159 has a composite structure having, between two radial internal and external annular elements 163 and 164, annular element 165 made of an elastically deformable material functioning as dampener and for tight application of the ring on side bearing surface 161 of central roller 155 in the area closest to rail 2, in order to ensure the effect of driving by friction. The diameters of rings 159 and the diameter of surface 161 make it possible to have the same speed at the points of contact.

The embodiment represented in FIG. 16 has the particularity of having only two rollers 167, 168 arranged in a V-shaped configuration and each having two axially peripheral rings, internal 170 and external 171, respectively, ring 170 coming into pin-point contact with the side surface of head 42 of rail 2 and ring 171 with the upper surface of the rail. So that there is no difference in the linear speeds at the areas of contact, point of contact 172 of exterior ring 170 and point of contact 173 of interior ring 171 have the same radial distance from the axis of inclined support shaft portion 174 of crankshaft 175.

The embodiment illustrated in FIG. 17 also has only two rollers 177, 178 arranged in a V-shaped configuration. One of the rollers, in the example represented, roller 177, has two areas axially separated from one another on its periphery, one area 180 intended for coming into pin-point contact with one of the two side surfaces of head 42 of rail 2, whereas the other area 181 comes into rolling contact on the upper surface of the head of the rail, in a manner similar to the two rings 170 and 171 of rollers 167 and 168 in the embodiment of FIG. 16.

However, unlike this embodiment, the other roller 178 of the embodiment in FIG. 17 has axial internal ring 183 comparable with ring 159 of the embodiment of FIG. 15, which, however, rests on inclined annular bearing surface 184 machined in side surface 185 of roller 177. Roller 178 also has external ring 186 which comes in contact with the other side surface of head 42 of the rail. As in the case of ring 159 of FIG. 15, ring 183 has elastically deformable layer 187 which ensures pressed application of the ring on its bearing surface 184 in order to ensure rotational driving by friction.

It should be noted that in all the embodiments of FIGS. 13 to 17 in which the synchronization of the rotation speeds occurs by frictional contact, a disengagement effect is produced when the friction exceeds a predetermined value, for example, in case of obstruction or an obstacle to the rotation of one of the parts in contact.

The large number of examples just described clearly illustrates the specificity of the invention which consists of ensuring frictionless rolling contacts of the rollers with the rail, with the advantage of requiring only small grooves in the roadway without danger for light vehicles and cycles. The axes of rotation of the rollers are generally inclined with respect to the horizontal and have toric surfaces providing pin-point contacts with the rail.

Figure 18:
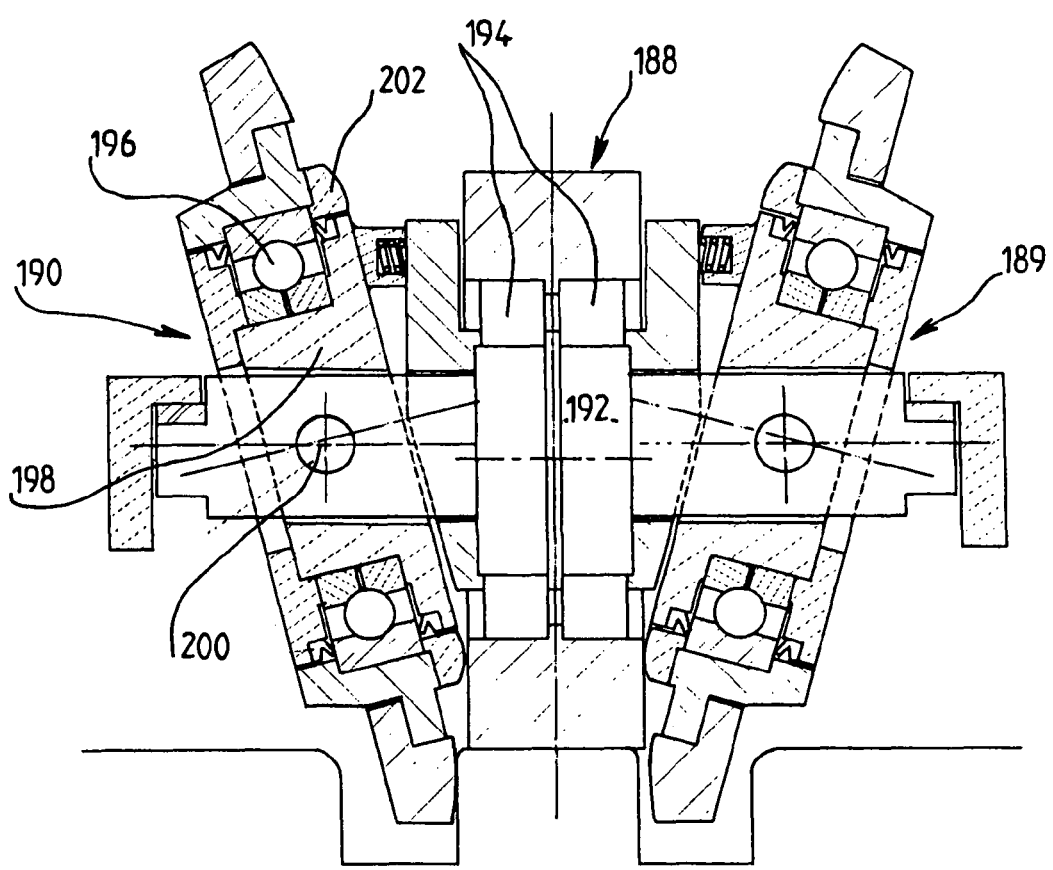
FIG. 18 is a section view, perpendicular to the rail, of yet another embodiment of the guiding system according to the invention.

FIG. 18 shows yet another embodiment.

According to this one, the guiding system has central roller 188 and two side rollers 189 and 190. Central roller 188 is rotationally guided on shaft 192 by rolling bearings 194. Each side roller is rotationally guided by ball bearing 196, on a hub 198. This hub is connected to shaft 192 by means of shaft 200. The synchronization of the side roller with respect to the central roller occurs by friction of ring 202 of the roller on central roller 188.

Given that each of hubs 198 is connected to shaft 192, when side roller 189 or 190 comes in contact with the rail, the side roller rotates around shaft 200. This rotation makes it possible to detach friction ring 202 from central roller 188. Thus, the side roller in contact is no longer synchronized with the central roller but rather with the rail.

The invention claimed is:

1. A system for guiding a vehicle along a guiding rail, having a rolling surface and at least one side surface that constitutes a guiding surface, the system comprising:
a guiding roller device cooperating with the rolling surface and the side surface of the rail and including
a rolling part having a peripheral surface for rolling contact with the rolling surface of the rail, and
at least one side part for contact with the side surface of the rail that faces the at least one side part, wherein
the rolling part and the side part are rotationally connected to each other so that the side part rotates at the same speed that the rolling part rolls on the rolling surface of the rail,
the side part includes at least one side roller,
the side roller has, in radial section, a portion with a convex profile, with an outermost surface that contacts the side surface of the rail, and
the rail has a substantial planar side surface for contacting the outermost surface of the convex profile of the side roller, so that the side roller, when in contact with the side surface of the rail, establishes a point of contact with the side surface of the rail.

2. The system according to claim 1, wherein
the rolling part includes at least one rolling support roller, and
the side part has a diameter and a shape for contacting the side surface of the rail so that the side roller, at the point of contact contacting the side surface of the rail, has the same rotational speed as the rolling part contacting the rolling surface of the rail.

3. The system according to claim 2, wherein the guiding system has two parallel guiding rails having respective exterior side surfaces as guiding surfaces, and the guiding system comprises a support roller and a side roller for each guiding rail.

4. A system for guiding a vehicle along a guiding rail, having a rolling surface and two side surfaces that constitute guiding surfaces, the system comprising:
a guiding roller device cooperating with the rolling surface and the side surfaces of the rail and including
a central roller having a peripheral surface for rolling contact with the rolling surface of the rail, and
two side rollers for contact with respective side surfaces of the rail that face the respective side rollers, wherein
the central roller and the side rollers are rotationally connected,
each of the side rollers has, in radial section, a portion with a convex profile having an outermost surface that contacts one of the side surfaces of the rail, and,
the rail has substantially planar side surfaces for contacting the outermost surfaces of the convex profiles of the side rollers, so that the two side rollers, when in contact with the respective side surfaces of the rail, contact the respective side surfaces of the rail at respective points of contact, and the two side rollers in contact with the respective side surfaces of the rail, rotate at the same speed that the central roller rolls on the rolling surface of the rail.

5. The system according to claim 4, wherein the side rollers are rotationally synchronized with the central roller.

6. The system according to claim 4, including means for synchronizing rotation speed of the side rollers with rotation speed of the central roller, the means for synchronizing comprising teeth associated respectively with the side roller and with the central roller, and which mesh with one another.

7. The system according to claim 6, wherein the teeth are mounted on a support via sliding means sliding between the teeth and the support when a force exceeding a predetermined threshold is applied to the sliding means.

8. The system according to claim 6, wherein the means for synchronizing rotation speed of the side rollers with rotation speed of the central roller includes belts and pulleys.

9. The system according to claim 6, wherein the means for synchronizing rotation speed of the side rollers with rotation speed of the central roller comprises a ring of a nondeformable solid material in contact with a bearing surface of the central roller for frictional engagement of the side rollers with the central roller.

10. The system according to claim 9, wherein the central roller includes a support shaft, a ring rotating freely, and a support device connected to the support shaft and maintaining the ring in position.

11. The system according to claim 10, wherein the support device comprises rollers supported by the ring and that come into rolling contact with an internal annular surface of the ring.

12. A system for guiding a vehicle along a guiding rail, having a rolling surface and two side surfaces that constitute guiding surfaces, the system comprising:

a guiding roller device cooperating with the rolling surface and the two side surfaces of the rail and including
two rollers, each roller having an axial external part for contacting a respective side surface of the rail and an axial internal part for contacting the rolling surface of the rail, wherein
the two rollers are arranged in a V-shaped configuration,
the two rollers are rotationally connected to each other so that the two rollers turn at the same speed,
each of the rollers has, in radial section, a portion with a convex profile, with an outermost surface that contacts one of the side surfaces of the rail, and
the rail has substantially planar side surfaces for contacting the outermost surfaces of the convex profiles of the rollers so that the two axial external parts, when in contact with the respective side surfaces of the rail, contact the respective side surfaces of the rail at respective points of contact.

13. A system for guiding a vehicle along a guiding rail, having a rolling surface and two side surfaces that constitute guiding surfaces, the system comprising:
a guiding roller device cooperating with the rolling surface and the side surfaces of the rail and including
first and second rollers, each of the first and second rollers having an axial external part for contacting a respective side surface of the rail, the first roller having an axial internal part for contacting the rolling surface of the rail, and the second roller having a peripheral ring for contacting an annular surface of the first roller to ensure rotation of the first roller by frictional engagement of the first and second rollers so that the first and second rollers turn at the same speed, wherein
the first and second rollers are arranged in a V-shaped configuration,
each of the first and second rollers has, in radial section, a portion with a convex profile, with an outermost surface that contacts one of the side surfaces of the rail, and
the rail has substantially planar contact surfaces for contacting the outermost surfaces of the convex profiles of the first and second rollers so that the axial external parts of the first and second rollers, when in contact with the respective side surfaces of the rail, contact the respective side surfaces of the rail at respective points of contact.

14. A system for guiding a vehicle along a guiding rail, having a rolling surface and at least one side surface that constitutes a guiding surface, the system comprising:
a guiding roller device cooperating with the rolling surface and the side surface of the rail and including
a rolling part having a peripheral surface for rolling contact with the rolling surface of the rail, and
at least one side part for contact with the side surface of the rail that faces the at least one side part, wherein
the side part has, in radial section, a portion with a convex profile having an outermost surface that contacts the side surface of the rail and the side surface of the rail that is contacted by the portion with the convex profile is substantially planar so that the side part, when in contact with the side surface of the rail, contacts the side surface of the rail at a respective point of contact, and the side part rotates at the same speed that the rolling part rolls on the rolling surface of the rail.

15. A system for guiding a vehicle along a guiding rail, having a rolling surface and at least one side surface that constitutes a guiding surface, the system comprising:
a guiding roller device cooperating with the rolling surface and the side surface of the rail and including
a rolling part having a peripheral surface for rolling contact with the rolling surface of the rail, and
at least one side part for contact with the side surface of the rail that faces the at least one side part, wherein
the side part comprises a side roller having an axis of rotation, and, in a plane perpendicular to the axis of rotation and inclined with respect to a plane perpendicular to the rolling surface of the rail, the side roller has, in radial section, a convex profile with an outermost surface that contacts the side surface of the rail, and
the side surface of the rail is substantially planar where contacted by the side roller so that the side roller, when in contact with the side surface of the rail, contacts the side surface of the rail at a respective point of contact, so the side roller rotates at the same speed as the rolling part rolling on the rolling surface of the rail.

* * * * *

UNITED STATES PATENT AND TRADEMARK OFFICE
CERTIFICATE OF CORRECTION

| | | |
|---|---|---|
| PATENT NO. | : 7,891,303 B2 | Page 1 of 1 |
| APPLICATION NO. | : 10/573411 | |
| DATED | : February 22, 2011 | |
| INVENTOR(S) | : Dupont et al. | |

It is certified that error appears in the above-identified patent and that said Letters Patent is hereby corrected as shown below:

Title Page, Item (75) Inventors: Change "Luo Boulat" to --Luc Boulat--.

Signed and Sealed this
Twenty-sixth Day of April, 2011

David J. Kappos
*Director of the United States Patent and Trademark Office*